US006831131B2

(12) United States Patent
Bouilloux et al.

(10) Patent No.: US 6,831,131 B2
(45) Date of Patent: Dec. 14, 2004

(54) COMPOSITION BASED ON POLYPROPYLENE ON AN ETHYLENE/ALKYL ACRYLATE COPOLYMER

(75) Inventors: Alain Bouilloux, Bernay (FR); Christophe Lacroix, Harquency (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/213,446

(22) Filed: Aug. 7, 2002

(65) Prior Publication Data

US 2003/0130429 A1 Jul. 10, 2003

(30) Foreign Application Priority Data

Aug. 7, 2001 (FR) ............................................. 01 10539

(51) Int. Cl.$^7$ ............................. C08J 5/00; C08K 3/00; C08K 3/04; C08K 5/00; C08L 23/10
(52) U.S. Cl. ...................... 525/191; 525/222; 525/223; 525/227; 525/232; 525/240
(58) Field of Search ................. 525/191, 222, 525/223, 227, 232, 240

(56) References Cited

U.S. PATENT DOCUMENTS 5,506,307 A    4/1996  Memon 5,962,591 A  * 10/1999  Ngoc et al. .................. 525/229
6,337,374 B1 *  1/2002  Ngoc et al. .................. 525/226

FOREIGN PATENT DOCUMENTS

| EP | 0330015 | 8/1989 |
|----|---------|--------|
| FR | 2797880 | 3/2001 |

* cited by examiner

*Primary Examiner*—Nathan M. Nutter
(74) *Attorney, Agent, or Firm*—Millen, White, Zelano & Branigan, P.C.

(57) ABSTRACT

The invention relates to a composition based on polypropylene homopolymer or copolymer and on an impact modifier comprising an ethylene/alkyl acrylate copolymer. This composition comprises substantially between 1 and 40% by weight of impact modifier and it may comprise an ethylene-based copolymer taken from the group comprising ethylene/acrylate copolymers, vinyl acetate copolymers, polyethylene obtained by metallocene catalysis or mPE and linear low-density polyethylene or LLDPE.

The PP thus modified is useful for manufacturing motor-vehicle parts for example of the bumper or dashboard type, requiring good thermomechanical strength over a wide range of temperatures.

23 Claims, No Drawings

COMPOSITION BASED ON POLYPROPYLENE ON AN ETHYLENE/ALKYL ACRYLATE COPOLYMER

The present invention relates to a composition based on polypropylene homopolymer or copolymer (PP), and on an ethylene/alkyl acrylate copolymer with a linear or branched alkyl group containing a number of carbon atoms greater than or equal to 6, preferably equal to 8, this composition acting as impact modifier for the polypropylene. The alkyl acrylate is preferably 2-ethylhexyl acrylate or n-octyl acrylate or a blend of 2-ethylhexyl acrylate and octyl acrylate. This impact-modified PP composition exhibits good impact strength properties, especially at low temperatures, compared with unmodified PPs or with PPs modified by ethylene/methyl acrylate (EMA) or ethylene/butyl acrylate (EBA) copolymers. This composition may optionally include reinforcing fillers.

These compositions are useful for manufacturing parts which have to exhibit good impact strength at room temperature and at low temperatures. These compositions may serve for manufacturing inter alia bumpers, tubes or pipes, panels or dashboards for motor vehicles, tarpaulins and membranes, and sheets or films for the interior furnishing of motor vehicles.

Document U.S. Pat. No. 5,272,210 discloses a composition comprising a propylene/ethylene copolymer and an ethylene/alkyl acrylate copolymer. The alkyl acrylate may be ethyl acrylate (EEA), methyl acrylate (EMA) and butyl acrylate (EBA), the latter two esters being preferred. The examples given in that patent are made with methyl acrylate. The films produced with these compositions have good sealing and flexibility properties at low temperatures.

Document U.S. Pat. No. 3,433,573 relates to a composition comprising a blend of predominantly propylene-based polypropylene and of an ethylene/vinyl acetate (EVA) copolymer for manufacturing sheets, films and moulded articles with improved coloration and properties at low temperatures, such as flexibility and strength.

Document U.S. Pat. No. 3,555,110 discloses polymer compositions having propylene and ethylene blocks or having propylene and 1-butene blocks which are blended with etheylene/ethyl acrylate (EEA) copolymers or with ethylene/vinyl acetate (EVA) copolymers, these compositions exhibiting improved impact strength properties at low temperatures.

Homopolymer polypropylene does not have a good impact strength. Ethylene/propylene random copolymers or ethylene-propylene block copolymers exhibit better impact strength values thanks to the EPR part generated during the polymerization phase. However, these products have limitations as it is not always possible for the necessary amounts of EPR (ethylene propylene rubber) to be synthesized in situ. These block copolymers without the EPR part prove to have a low impact strength in applications at low temperatures.

Copolymers of the ethylene/acrylic ester, ethylene/methyl acrylate and ethylene/butyl acrylate (EMA, EBA) type are impact modifiers for PP but do not make it possible to obtain impact strength values comparable with the values from EPRs or EPDMs.

We have now found an impact modifier for polypropylene based on ethylene/alkyl acrylate, preferably 2-ethylhexyl acrylate, abbreviated to 2EHA in the rest of the text, or n-octyl acrylate, making it possible to obtain impact strength values higher than those obtained with conventional copolymers of the EMA or EBA type and especially good low-temperature impact strength.

The subject of the invention is a composition comprising polypropylene homopolymer or copolymer (A), and an ethylene/alkyl acrylate copolymer as impact modifier with a linear or branched alkyl group containing a number of carbon atoms greater than or equal to 6, preferably greater than or equal to 7.

According to one embodiment of the composition, the alkyl acrylate is 2-ethylhexyl acrylate, n-octyl acrylate or a blend thereof.

According to one embodiment of the composition, this comprises at least one polyethylene (B) taken from the group comprising LDPE, HDPE, LLDPE, VLDPE, polyethylene obtained by metallocene catalysis, EPR and EPDM elastomers, polyethylene/EPR or EPDM blends, ethylene/alkyl (meth)acrylate copolymers and ethylene/vinyl acetate copolymers. According to one embodiment of the composition, the ethylene/vinyl acetate copolymers are ethylene/vinyl acetate/maleic anhydride terpolymers.

According to one embodiment of the composition, the ethylene/alkyl (meth)acrylate copolymers are ethylene/alkyl (meth)acrylate/maleic anhydride terpolymers, ethylene/alkyl (meth)acrylate/glycidyl methacrylate terpolymers or ethylene/alkyl (meth)acrylate/(meth)acrylic acid terpolymers.

According to one embodiment of the composition, the latter comprises between about 1 and 60%, preferably 1 to 40%, by weight of ethylene/alkyl (meth)acrylate copolymer.

According to one embodiment of the composition, the latter comprises at least one additive taken from the group comprising stabilizers, antioxidants, plasticizers, lubricants, carbon black and colouring agents.

According to one embodiment of the composition, the latter includes fillers.

The subject of the invention is also the use of the composition described above for manufacturing sheets, membranes, films, tarpaulins, dashboards for motor vehicles, tubes or pipes, panels and bumpers requiring good thermomechanical strength over a wide range of temperatures.

As regards the polypropylene (A), this is a homopolymer or copolymer.

As comonomers, mention may be made of:

alpha-olefins, advantageously those having from 3 to 30 carbon atoms.

Examples of alpha-olefins having from 3 to 30 carbon atoms has possible comonomers comprise ethylene, 1-butene, 1-pentene, 3-methyl-1-butene, 4-methyl-1-pentene, 4,4-dimethyl-1-pentene, 3-methyl-1-pentene, 4-methyl-1-hexene, 5-methyl-1-hexene, 1-hexene, 1-heptene, 1-octene, 1-decene, 1-dodecene, 1-tetradecene, 1-hexadecene, 1-octadecene, 1-eicocene, 1-dococene, 1-tetracocene, 1-hexacocene, 1-octacocene, 1-triacontene, styrene, allylbenzene, allylcyclohexane, allylcyclopentane and vinylcyclohexane. These alpha-olefins may be used by themselves or as a mixture of two or more of them.

dienes, such as for example 1,4-hexadiene.

The polypropylene (A) may also be a propylene/alpha-olefin block copolymer. In general, the block polymers are prepared by polymerizing an alpha-olefin and then adding, to the reaction mixture, another alpha-olefin, one of the two alpha-olefins being propylene. In the case of a polypropylene copolymer having propylene and ethylene blocks, the polymerization leads to the formation of block polymers containing segments of propylene units or polypropylene segments and segments of ethylene units or polyethylene segments. These block polymers have in general only two segments in their chain and consist of a polypropylene segment comprising about 50% to 99% by weight and a polyalpha-olefin segment, other than polypropylene, comprising approximately 50% to 1% by weight.

The present invention relates to PPs obtained by Ziegler-Natta catalysis and to PPs obtained by metallocene catalysis. As regards the PPs obtained by metallocene catalysis, mention may be made of syndiotactic and isotactic PPs.

Good low-temperature impact properties are obtained with relatively small amounts of ethylene/alkyl acrylate copolymer with a linear or branched alkyl group containing a number of carbon atoms greater than or equal to 6, preferably greater than or equal to 7 in the compositions according to the invention.

The compositions according to the invention comprise about 1 to 60%, preferably 1 to 40%, by weight of ethylene/alkyl acrylate copolymer and about 99 to 35% by weight of polypropylene homopolymer or copolymer (A), and optionally at least one other polymer (B), the total of the percentages being 100%.

The ethylene/alkyl acrylate copolymer comprises about 55 to 99% by weight of ethylene and about 45 to 1% by weight of alkyl acrylate with the total of the percentages making 100%.

The compositions according to the invention may include, in addition to the polypropylene (A) and the ethylene/alkyl acrylate copolymer, at least one other polymer (B) chosen from polyethylene homopolymers or copolymers.

As comonomers for the polyethylene (B), mentioned may be made of:

alpha-olefins, advantageously those having from 3 to 30 carbon atoms. Examples of alpha-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These alpha-olefins may be used by themselves or as a mixture of two or more of them;

unsaturated carboxylic acid esters such as, for example, alkyl (meth)acrylates, the alkyls possibly having up to 24 carbon atoms. Examples of alkyl acrylates or methacrylates are especially methyl methacrylate, methyl acrylate, ethylmethacrylate, ethyl acrylate, n-butyl acrylate, isobutyl acrylate, 2-ethylhexyl acrylate, gycidyl methacrylate and n-octyl acrylate;

vinyl esters of saturated carboxylic acids such as, for example, vinyl acetate or vinyl propionate;

unsaturated epoxides. Examples of unsaturated epoxides are especially aliphatic glycidyl esters and ethers such as allyl glycidyl ether, vinyl glycidyl ether, glycidyl maleate, glycidyl itaconate, glycidyl acrylate, glycidyl methacrylate and alicyclic glycidyl esters and ethers such as 2-cyclohex-1-yl glycidyl ether, diglycidyl cyclohexene-4-5-dicarboxylate, glycidyl cyclohexene-4-carboxylate, glycidyl 2-methyl-5-norbornene-2-carboxylate and diglycidyl endo-cis-bicyclo[2.2.1] hept-5-ene-2,3-dicarboxylate;

unsaturated carboxylic acids, their salts and their anhydrides. Examples of unsaturated dicarboxylic acid anhydrides are especially maleic anhydride, itaconic anhydride, citraconic anhydride and tetrahydrophthalic anhydride;

dienes such as, for example, 1,4-hexadiene.

The ethylene copolymer (B) may comprise several comonomers.

Advantageously, the polymer (B), which may be a blend of several polymers, comprises at least 50 mol % and preferably 75 mol % of ethylene. The density of (B) may be between 0.86 and 0.98 g/cm$^3$. The MFI (melt flow index at 190° C./2.16 kg) is advantageously between 1 and 1000 g/10 min.

As examples of polymers (B), mention may be made of:

low-density polyethylene (LDPE), high-density polyethylene (HDPE), linear low-density polyethylene (LLDPE) and very low-density polyethylene (VLDPE);

polyethylene obtained by metallocene catalysis, that is to say polymers obtained by the copolymerization of ethylene with an alpha-olefin such as propylene, butene, hexene or octane, in the presence of a mono-site catalyst generally consisting of a zirconium or titanium atom and two alkyl cyclic molecules linked to the metal;

EPR (ethylene/propylene rubber) elastomers, EPDM (ethylene/propylene/diene) elastomers, blends of polyethylene with an EPR or an EPDM;

ethylene/alkyl (meth)acrylate copolymers possibly containing up to 60%, and preferably 2 to 40%, by weight of alkyl (meth)acrylate;

ethylene/alkyl (meth)acrylate/maleic anydride or ethylene/alkyl (meth)acrylate/glycidyl methacrylate or ethylene/alkyl (meth)acrylate/(meth)acrylic acid terpolymers possibly containing from 0 to 60% and preferably from 2 to 40% by weight of alkyl (meth)acrylate, the amount of maleic anhydride or of glycidyl methacrylate or of (meth)acrylic acid (depending on the terpolymer chosen) being between 0 and 10% and preferably between 0.2 and 6% by weight, and ethylene/vinyl acetate/maleic anydride copolymers, the proportions of alkyl (meth)acrylate and of maleic anydride being in this case the same as in the case of the above ethylene/alkyl (meth)acrylate/maleic anhydride copolymer;

ethylene/glycidyl methacrylate, ethylene/acrylic acid and ethylene/methacrylic acid copolymers.

The compositions according to the invention may also contain various additives such as stabilizers, antioxidants, plasticizers, lubricants, carbon black or colouring agents normally used in polyolefins. They may also contain fillers such as talc, mica, kaolin, wollastonite and glass fibres or spheres. Such additives and/or fillers may be added to the composition according to the invention in necessary and sufficient amounts known to those skilled in the art, without modifying the impact properties of the blend thus obtained.

The invention will now be illustrated by examples included in the present application so as to illustrate it, but not to limit the scope.

In the rest of the text, the various types of fracture are abbreviated by CF, PF, IF and HF corresponding to:

CF or Complete Fracture: There is complete fracture when the bar breaks and two separate fragments are obtained at the end of the notched Charpy impact test;

PF or Partial Fracture: There is partial fracture when the propagation of the crack below the notch is incomplete. The crack stops somewhere in thickness of the test piece and the bar remains intact at the end of the notched Charpy impact test;

IF or Impossible Fracture: Impossible fracture refers to the case when there is no fracture, the bar being too flexible;

HF or Hybrid Fracture: Hybrid fracture refers to the case when, during the fracture tests carried out on bars of the same composition at a given temperature, two of the types of fracture described above are encountered. For example, on the same batch of bars a certain number undergo CF while others undergo PF.

The abbreviation MFI in the rest of the text means the Melt Flow Index.

The impact strength was evaluated on bars injection-moulded and then notched according to the Charpy method and as per the ISO 179:93-1eA standard at a given temperature (+23° C., 0° C., −20° C., −30° C. and −40° C.).

The standard deviation was evaluated from the impact strength measurements on 10 specimens of the same composition.

The compositions in Tables 1A, 1B, 2A and 2B were produced in a Werner & Pfleiderer 30 mm diameter twin-screw extruder, the rotation speed of the screws being 300 rpm, the output being 20 kg/h and the material temperatures being around 220 to 230° C.

The products used to produce the compositions in Table 1A and Table 1B were the following:
PP: PP of MFI=11 g/10 min with an ethylene percentage= 9% by weight, i.e. an EPR (50/50) content=18% by weight;
EMA: ethylene/methyl acrylate copolymer with 24% by weight of methyl acrylate (MA) and an MFI of 0.5 g/10 min measured at 190° C./2.16 kg;
E2EHA: ethylene/2-ethylhexyl acrylate copolymer with 32% by weight of 2-ethylhexyl acrylate and an MFI of 2 g/10 min measured at 190° C./2.16 kg;
mPE: Metallocene PE sold by Dow Chemical under the name ENGAGE8842®.

The impact strength of Examples Ex1 and Ex2 according to the invention is significantly improved, taking into account the standard deviation, over the Comparative Examples C1 and C4 produced using PP without any impact modifier.

The products used to produce the compositions in Table 2A and Table 2B were the following:
PP: of MFI=11 g/10 min with a percentage of ethylene= 9% by weight, i.e. an EPR (50/50) content=18% by weight;
EMA: ethylene/methyl acrylate copolymer with 24% by weight of methyl acrylate (MA) and an MFI of 0.5 g/10 min measured at 190° C./2.16 kg;
EVA: ethylene/vinyl acetate copolymer with 28% by weight of vinyl acetate and an MFI of 4 g/10 min measured at 190° C./2.16 kg;
EBA: ethylene/butyl acrylate copolymer with 30% by weight of butyl acrylate (BA) and an MFI of 2 g/10 min measured at 190° C./2.16 kg;
E2EHA: ethylene/2-ethylhexyl acrylate copolymer with 35% by weight of 2-ethylhexyl acrylate and an MFI of 2 g/10 min measured at 190° C./2.16 kg;
mPE: metallocene PE sold by Dow Chemical, used previously.

Tables 2A and 2B clearly show that replacing the conventional modifiers of the EMA or EBA copolymer type with an E2EHA copolymer in a PP composition improves the impact strength performance. This is because the impact values go from between 11.7 kJ/m$^2$ (C7) and 19.8 kJ/m$^2$ (C8) with complete fracture to an impact value of about 53 kJ/m$^2$ (Ex3 and Ex4) with partial fracture at +23° C. The impact strength performance of the E2EHA-modified PP according to the invention is comparable to that of the mPE-modified PP compositions.

It may also be seen, from the impact strength results of C9 and Ex4, that the modified PP according to the invention retains good impact properties even when it is in combination with another modifier such as EVA.

The compositions in Table 3 and in Table 4 were extruded in a Werner & Pfleiderer 40 mm diameter twin-screw extruder. The speed of rotation of the screws was 250 rpm, the output was 80 kg/h and the material temperatures were around 220–230° C.

The products used to produce the compositions in Tables 3 and 4 were the following:
PP: PP homopolymer with MFI of 12 g/10 min measured at 230° C./2.16 kg;
EMA: ethylene/methyl acrylate copolymer with 24% by weight of methyl acrylate (MA) and an MFI of 0.5 measured at 190° C./2.16 kg;
E2EHA: ethylene/2-ethylhexyl acrylate copolymer with 35% by weight of 2-ethylhexyl acrylate and an MFI of 2 g/10 min measured at 190° C./2.16 kg;
mPE: metallocene PE sold by Dow Chemical, used previously;
EBA: ethylene/butyl acrylate copolymer with 30% by weight of butyl acrylate (BA) and an MFI of 2 g/10 min measured at 190° C./2.16 kg;
EVA: ethylene/vinyl acetate copolymer with 28% by weight of vinyl acetate and an MFI of 4 g/10 min measured at 190° C./2.16 kg.

Table 3 shows that Ex7 (PP+E2EHA) according to the invention gives better Charpy impact results than Comparative Examples C18 (PP) and C19 (PP+EMA).

In Table 4, the Charpy impact results of Examples Ex8 and Ex9 according to the invention, comprising PP+E2EHA in their composition, are improved over the Charpy impact results of the Comparative Examples C21, C22, C23 and C24 which do not include E2EHA. Moreover, considerably better results are obtained for Ex9 comprising PP+E2EHA+ EVA compared with Ex8.

The examples in Tables 3 and 4 have better impact properties than those of the corresponding Comparative Examples. However, it may be seen that with a PP homopolymer the results are less striking than with the PPs used for the examples in the preceding tables.

The compositions in Table 5A and in Table 5B were extruded in a Werner & Pfleiderer 30 mm diameter twin-screw extruder. The speed of rotation of the screws was 300 rpm, the output was 20 kg/h and the material temperatures were around 220–230° C.

Tables 5A and 5B correspond to compositions comprising 87% PP and 13% impact modifier in the case of C27, C29, Ex10 and Ex11, or comprising 100% PP in the case of C26 and C28. The PPs used in Tables 5A and 5B are different, but the impact performance is very similar however.

The products used to produce the compositions in Table 5A and Table 5B were the following:
PP: PP of MFI=11 g/10 min with a percentage of ethylene=9% by weight, i.e. an EPR (50/50) content= 18% by weight;
mPE: metallocene PE sold by Dow Chemical, used previously;
E2EHA: ethylene/2-ethylhexyl acrylate copolymer with 35% by weight of 2-ethylhexyl acrylate and an MFI of 2 g/10 min measured at 190° C./2.16 kg;
LLDPE: linear low-density polyethylene of density 0.920 and of MFI 0.9 measured at 190° C./2.16 kg.

Although produced with PPs of different sources, Comparative Examples C27 and C29 indicate the base performance of these formulations—they are very similar taking the standard deviations of measurement into account.

It may be seen that replacing the mPE in C29 with the E2EHA copolymer giving Ex10 results in an impact improvement. This is because the impact strength passes from a value of 20 kJ/m² with HF to a value of 35 kJ/m² with PF at +23° C.

Moreover, if the LLDPE of C29 is replaced with the E2EHA copolymer giving Ex11, it may be seen that the impact strength is twice as high, going from a value of 20 kJ/m² to a value of 44 kJ/m² at +23° C.

The compositions in Table 6 were extruded in a Werner & Pfleiderer 40 mm diameter twin-screw extruder. The speed of rotation of the screws was 250 rpm, the output was 40 kg/h and the material temperatures were around 220° C.

The products used to produce the compositions in Table 6 were the following:

PP: PP/PE block copolymer of MFI of 15 g/10 min at 230° C./2.16 kg;

Talc: STEAMIC OOS® talc;

E2EHA: ethylene/2-ethylhexyl acrylate copolymer with 35% by weight of 2-ethylhexyl acrylate and an MFI of 2 g/10 min measured at 190° C./2.16 kg;

EMA: ethylene/methyl acrylate copolymer with 29% by weight of methyl acrylate (MA) and an MFI of 3 g/10 min measured at 190° C./2.16 kg;

EBA: ethylene/butyl acrylate copolymer with 30% by weight of butyl acrylate (BA) and an MFI of 2 g/10 min at 190°/2.16 kg;

mPE: metallocene PE sold by Dow Chemical, used previously.

In the compositions in Table 6, the talc provides the material with the necessary stiffness while the impact modifier makes it possible to increase the impact strength reduced by the talc introduced into the composition.

The impact strength of Examples Ex12, Ex13 and Ex14 comprising, as impact modifier, EMA, EBA and E2EHA respectively, is better than that obtained with mPE in Comparative Example C30.

The compositions in Table 7 are extruded in a Werner & Pfleiderer 30 mm diameter twin-screw extruder. The speed of rotation was 250 rpm, the output was 25 kg/h and the material temperatures were around 230° C.

The products used to produce the compositions in Table 7 were the following:

PP(1): PP/PE block copolymer of MFI=5 g/10 min at 250° C./2.16 kg;

PP(2): PP homopolymer of MFI=12 g/10 min at 230° C./2.16 kg;

E2EHA: ethylene/2-ethylhexyl acrylate copolymer with 35% by weight of 2-ethylhexyl acrylate and an MFI of 2 g/10 min measured at 190° C./2.16 kg;.

EMA: ethylene/methyl acrylate copolymer with 29% by weight of methyl acrylate (MA) and an MFI of 3 g/10 min measured at 190° C./2.16 kg;

LOTADER AX8900®: terpolymer based on glycidyl methacrylate (GMA);

LOTADER 4700®: terpolymer based on maleic anydride (MAH);

LUCALEN 3110® (from BASF): ethylene/butyl acrylate/acrylic acid terpolymer with an 88/8/4 ratio respectively and having an MFI=6 to 8 g/10 min at 190° C./2.16 kg.

Table 7 gives compositions comprising PP, an EMA or E2EHA copolymer as impact modifier and a blend of three components (LOTADER AX8900®, LOTADER 4700® and LUCALEN 3110®) which crosslink during compounding so as to keep the impact modifier in the dispersed phase in the PP matrix and thus guarantee the morphological stability of the composition. Moreover, the good thermal resistance of the composition is also maintained thanks to the PP.

In the compositions of Comparative Examples C31 and C32 and Examples Ex15 and Ex16 of Table 7, the EMA and E2EHA copolymers are softening agents for the PP matrix, whether the latter is a block copolymer (C31 and Ex15) or a homopolymer (C32 and Ex16). For both types of PP (block copolymer or homopolymer), an increase in the impact strength is observed when the EMA copolymer is replaced with the E2EHA copolymer.

TABLE 1A

|  |  | C1 | C2 | C3 | EX1 |
|---|---|---|---|---|---|
| Compositions | PP | 100% | 90% | 90% | 90% |
|  | EMA |  | 10% |  |  |
|  | E2EHA |  |  |  | 10% |
|  | mPE |  |  | 10% |  |
| Notched Charpy impact in kJ/m² | at +23° C. | 9.5 | 11 | 10.5 | 14.2 |
|  | at −30° C. | 3.9 | 3.3 | 4.5 | 4.8 |
| Standard deviation | at +23° C. | 0.8 | 0.8 | 0.7 | 0.7 |
|  | at −30° C. | 0.5 | 0.1 | 0.6 | 0.2 |
| Type of fracture | at +23° C. | CF | CF | CF | CF |
|  | at −30° C. | CF | CF | CF | CF |

TABLE 1B

|  |  | C4 | C5 | EX 2 |
|---|---|---|---|---|
| Compositions | PP | 100% | 90% | 90% |
|  | E2EHA |  |  | 10% |
|  | mPE |  | 10% |  |
| Notched Charpy impact in kJ/m² | at +23° C. | 8.1 | 12.8 | 12.8 |
|  | at −30° C. | 3.4 | 5 | 3.7 |
| Standard deviation | at +23° C. | 0.5 | 1.1 | 0.7 |
|  | at −30° C. | 0.2 | 0.2 | 0.2 |
| Type of fracture | at +23° C. | CF | CF | CF |
|  | at −30° C. | CF | CF | CF |

TABLE 2A

|  |  | C6 | C7 | C8 | C9 | EX 3 | EX 4 | C10 |
|---|---|---|---|---|---|---|---|---|
| Compositions | PP | 100% | 80% | 80% | 80% | 80% | 80% | 80% |
|  | EMA |  | 20% |  |  | 10% |  |  |

TABLE 2A-continued

|  |  | C6 | C7 | C8 | C9 | EX 3 | EX 4 | C10 |
|---|---|---|---|---|---|---|---|---|
|  | EBA |  |  | 20% |  |  |  |  |
|  | E2EHA |  |  |  |  | 20% | 10% |  |
|  | EVA |  |  |  | 10% |  | 10% |  |
|  | mPE |  |  |  |  |  |  | 20% |
| Notched Charpy | at +23° C. | 9.5 | 11.7 | 19.8 | 14.1 | 53 | 53.7 | 53.7 |
| impact in kJ/m² | at −30° C. | 3.9 | 2.4 | 5.5 | 3.7 | 6.2 | 6.4 | 7.6 |
| Standard | at +23° C. | 0.8 | 1 | 1 | 0.6 | 1.4 | 1 | 1 |
| deviation | at −30° C. | 0.5 | 0.5 | 0.2 | 0.4 | 0.3 | 0.5 | 0.2 |
| Type of fracture | at +23° C. | CF | CF | CF | CF | PT | PT | PT |
|  | at −30° C. | CF | CF | CF | CF | CF | CF | CF |

TABLE 2B

|  |  | C11 | C12 | C13 | C14 | Ex 5 | C15 | C16 | Ex 6 | C17 |
|---|---|---|---|---|---|---|---|---|---|---|
| Compositions | PP | 100% | 80% | 80% | 80% | 80% | 80% | 100% | 80% | 80% |
|  | EMA |  | 20%(1) | 20%(2) |  |  |  |  |  |  |
|  | EBA |  |  |  | 20% |  |  |  |  |  |
|  | E2EHA |  |  |  |  | 20% |  |  | 20% |  |
|  | EVA |  |  |  |  |  | 20% |  |  | 20% |
|  | MPE |  |  |  |  |  |  |  |  |  |
| Notched Charpy | at +23° C. | 8.7 | 11.2 | 14.3 | 15–34 | 45.4 | 58.2 | 8.1 | 46 | 58.5 |
| impact in kJ/m² | at −30° C. | 3.6 | 2.3 | 2.5 | 3.4 | 4.8 | 6.9 | 3.4 | 4.5 | 7.4 |
| Standard | at +23° C. | 0.4 | 0.5 | 0.8 |  | 1.2 | 0.2 | 0.5 | 1 | 0.8 |
| deviation | at −30° C. | 0.3 | 0.2 | 0.4 | 0.2 | 0.1 | 0.3 | 0.2 | 0.4 | 0.2 |
| Type of fracture | at +23° C. | CF | CF | CF | HF(3) | PF | PF | CF | PF | PF |
|  | at −30° C. | CF | CF | CF | CF | CF | CF | CF | CF | CF |

(1)EMA copolymer with 18% by weight of methyl acrylate and an MFI of 2 g/10 min measured at 190° C. /2.16 kg;
(2)EMA copolymer with 29% by weight of methyl acrylate and an MFI of 3 g/10 min measured at 190° C. /2.16 kg;
(3)Hybrid fracture with both CF and PF.

TABLE 3

|  |  | C18 | C19 | EX 7 | C20 |
|---|---|---|---|---|---|
| Compositions | PP | 100% | 90% | 90% | 90% |
|  | EMA |  | 10% |  |  |
|  | E2EHA |  |  | 10% |  |
|  | MPE |  |  |  | 10% |
| Notched Charpy | at +23° C. | 2.4 | 3.3 | 3.6 | 4.9 |
| impact in kJ/m² | at −30° C. | 1.4 | 1.1 | 1.7 | 1.4 |
| Standard deviation | at +23° C. | 0.2 | 0.2 | 0.2 | 0.2 |
|  | at −30° C. | 0.3 | 0.2 | 0.3 | 0.3 |
| Type of fracture | at +23° C. | CF | CF | CF | CF |
|  | at −30° C. | CF | CF | CF | CF |

TABLE 4

|  |  | C21 | C22 | C23 | C24 | EX 8 | EX 9 | C 25 |
|---|---|---|---|---|---|---|---|---|
| Compositions | PP | 100% | 80% | 80% | 80% | 80% | 80% | 80% |
|  | EMA |  | 20% | 10% |  |  |  |  |
|  | EBA |  |  |  | 20% |  |  |  |
|  | E2EHA |  |  |  |  | 20% | 10% |  |
|  | EVA |  |  | 10% |  |  | 10% |  |
|  | mPE |  |  |  |  |  |  | 20% |
| Notched Charpy | at +23° C. | 2.4 | 3.8 | 4.2 | 4.2 | 4.8 | 5.1 | 7.8 |
| impact in kJ/m² | at −30° C. | 1.4 | 1.3 | 1.4 | 1.8 | 1.8 | 1.5 | 2.2 |
| Standard | at +23° C. | 0.2 | 0.3 | 0.3 | 0.1 | 0.2 | 0.4 | 0.2 |
| deviation | at −30° C. | 0.3 | 0.3 | 0.3 | 0.2 | 0.2 | 0.3 | 0.4 |
| Type of fracture | at +23° C. | CF | CF | CF | CF | CF | CF | CF |
|  | at −30° C. | CF | CF | CF | CF | CF | CF | CF |

TABLE 5A

|  |  | C26 | C27 |
|---|---|---|---|
| Compositions | PP | 100% | 87% |
|  | mPE |  | 8% |
|  | LLDPE |  | 5% |
| Notched Charpy impact in kJ/m$^2$ | at +23° C. | 9.5 | 18.7 |
|  | at −30° C. | 3.9 | 6.3 |
| Standard deviation | at +23° C. | 0.8 | 2.1 |
|  | at −30° C. | 0.5 | 0.6 |
| Type of fracture | at +23° C. | CF | CF |
|  | at −30° C. | CF | CF |

TABLE 5B

|  |  | C28 | C29 | EX 10 | EX 11 |
|---|---|---|---|---|---|
| Compositions | PP | 100% | 87% | 87% | 87% |
|  | mPE |  | 8% |  | 8% |
|  | E2EHA |  |  | 8% | 5% |
|  | LLDPE |  | 5% | 5% |  |
| Notched Charpy impact in kJ/m$^2$ | at +23° C. | 8.1 | 20 | 35 | 44 |
|  | at 0° C. | 4.5 | 8 | 7.3 | 7.5 |
|  | at −20° C. | 3.6 | 6.2 | 5.4 | 6 |
|  | at −30° C. | 3.4 | 5.3 | 4.4 | 5.5 |
| Standard deviation | at +23° C. | 0.5 |  |  |  |
|  | at 0° C. | 0.5 | 0.4 | 0.4 | 0.3 |
|  | at −20° C. | 0.2 | 0.2 | 0.2 | 0.2 |
|  | at −30° C. | 0.2 | 0.2 | 0.6 | 0.3 |
| Type of fracture | at +23° C. | CF | HF (1) | PF | PF |
|  | at 0° C. | CF | CF | CF | CF |
|  | at −20° C. | CF | CF | CF | CF |
|  | at −30° C. | CF | CF | CF | CF |

(1) Hybrid fracture with 90% of the bars undergoing CF and 10% PF.

TABLE 6

|  |  | EX 12 | EX 13 | EX 14 | C30 |
|---|---|---|---|---|---|
| Compositions | PP | 78% | 78% | 78% | 78% |
|  | Talc | 12% | 12% | 12% | 12% |
|  | EMA | 10% |  |  |  |
|  | EBA |  | 10% |  |  |
|  | E2EHA |  |  | 10% |  |
|  | mPE |  |  |  | 10% |
| Notched Charpy impact in kJ/m$^2$ | at +23° C. | 8.7 | 8.8 | 8.8 | 6.5 |
|  | at −30° C. | 2.1 | 2.3 | 2.2 | 2.5 |
| Standard deviation | at +23° C. | 0.7 | 0.7 | 0.3 | 0.3 |
|  | at −30° C. | 0 | 0.1 | 0.1 | 0.3 |
| Type of fracture | at +23° C. | CF | CF | CF | CF |
|  | at −30° C. | CF | CF | CF | CF |

TABLE 7

|  |  | C31 | EX 15 | C32 | EX 16 |
|---|---|---|---|---|---|
| Compositions | PP | 40% (1) | 40% (1) | 40% (2) | 40% (2) |
|  | EMA | 20% |  | 20% |  |
|  | E2EHA |  | 20% |  | 20% |
|  | LOTADER AX 8900 | 7% | 7% | 7% | 7% |
|  | LOTADER 4700 | 28% | 28% | 28% | 28% |
|  | LUCALEN | 5% | 5% | 5% | 5% |
| Notched Charpy impact in kJ/m$^2$ | at +23° C. |  |  | 17.7 |  |
|  | at −30° C. | 2.7 | 12.3 | 1.9 | 4.9 |
| Standard deviation | at +23° C. |  |  | 1.4 |  |
|  | at −30° C. | 0.4 | 0.6 | 0.1 | 0.6 |
| Type of fracture | at +23° C. | IF | IF | PF | IF |
|  | at −30° C. | CF | CF | CF | CF |

(1) PP block copolymer of MFI = 5 g/10 min measured at 230° C. /2.16 kg;
(2) PP homopolymer of MFI = 12 g/10 min measured at 230° C. /2.16 kg.

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 01/10.539, filed Aug. 7, 2001 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A composition comprising a polypropylene homopolymer or copolymer (A) and an impact modifier, wherein said impact modifier comprises at least one copolymer selected from: ethylene/2-ethylhexyl acrylate, ethylene/n-octyl acrylate and ethylene/2-ethylhexyl acrylate/n-octyl acrylate.

2. A composition according to claim 1, further comprising at least one polyethylene (B) selected from the group comprising LDPE, HDPE, LLDPE, VLDPE, polyethylene obtained by metallocene catalysis, EPR and EPDM elastomers, polyethylene/EPR or EPDM blends, ethylene/alkyl (meth)acrylate copolymers and ethylene/vinyl acetate copolymers.

3. A composition according to claim 2, comprising at least one ethylene/vinyl acetate copolymer selected from ethylene/vinyl acetate/maleic anhydride terpolymers.

4. A composition according to claim 2, comprising at least one ethylene/alkyl (meth)acrylate copolymer selected from ethylene/alkyl (meth)acrylate/maleic anhydride terpolymers, ethylene/alkyl (meth)acrylate/glycidyl methacrylate terpolymers or ethylene/alkyl (meth)acrylate/(meth)acrylic.

5. A composition according to claim 2, wherein said composition contains 1 to 60% by weight of ethylene/alkyl (meth)acrylate copolymer.

6. A composition according to claim 3, wherein said composition contains 1 to 60% by weight of at least one of said ethylene/vinyl acetate/maleic anhydride terpolymers.

7. A composition according to claim 4, wherein said composition contains 1 to 60% by weight of said ethylene/alkyl (meth)acrylate copolymer.

8. A composition according to claim 5, wherein said composition contains 1 to 40% by weight of ethylene/alkyl (meth)acrylate copolymer.

9. A composition according to claim 6, wherein said composition contains 1 to 40% by weight of ethylene/alkyl (meth)acrylate copolymer.

10. A composition according to claim 7, wherein said composition contains 1 to 40% by weight of ethylene/alkyl (meth)acrylate copolymer.

11. A composition according to claim 1, further comprising at least one additive selected from the group comprising stabilizers, antioxidants, plasticizers, lubricants, carbon black and coloring agents.

12. A composition according to claim 2, further comprising at least one additive selected from the group comprising stabilizers, antioxidants, plasticizers, lubricants, carbon black and coloring agents.

13. A composition according to claim 5, further comprising at least one additive selected from the group comprising stabilizers, antioxidants, plasticizers, lubricants, carbon black and coloring agents.

14. A composition according to claim 1, further comprising at least one filler.

15. A composition according to claim 2, further comprising at least one filler.

16. A composition according to claim 5, further comprising at least one filler.

17. In a process comprising manufacturing sheets, membranes, films, tarpaulins, dashboards for motor vehicles, tubes or pipes, panels or bumpers from a polypropylene composition, the improvement wherein said composition comprises a polypropylene homopolymer or copolymer (A) and an impact modifier, wherein said impact modifier comprises at least one copolymer selected from: ethylene/2-ethylhexyl acrylate, ethylene/n-octyl acrylate and ethylene/2-ethylhexyl acrylate/n-octyl acrylate.

18. A composition according to claim 1, comprising ethylene/2-ethlyhexyl acrylate.

19. A composition according to claim 1, comprising ethlylene/n-octyl acrylate.

20. A composition according to claim 1, comprising ethlylene/2-ethlyhexyl acrylate/n-octyl acrylate.

21. A composition according to claim 2, comprising ethlylene/2-ethlyhexyl acrylate.

22. A composition according to claim 2, comprising ethlylene/n-octyl acrylate.

23. A composition according to claim 2, comprising ethlylene/2-ethlyhexyl acrylate/n-octyl acrylate.

* * * * *